(12) United States Patent
Duan

(10) Patent No.: US 11,947,451 B2
(45) Date of Patent: Apr. 2, 2024

(54) MAPPING DESCRIPTORS FOR READ OPERATIONS

(71) Applicant: Micron Technology, Inc., Boise, ID (US)

(72) Inventor: Xing Hui Duan, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/051,155

(22) PCT Filed: Apr. 22, 2020

(86) PCT No.: PCT/CN2020/086039
§ 371 (c)(1),
(2) Date: Oct. 27, 2020

(87) PCT Pub. No.: WO2021/212353
PCT Pub. Date: Oct. 28, 2021

(65) Prior Publication Data
US 2023/0153234 A1    May 18, 2023

(51) Int. Cl.
*G06F 12/02* (2006.01)
*G06F 12/128* (2016.01)

(52) U.S. Cl.
CPC ........ *G06F 12/0238* (2013.01); *G06F 12/128* (2013.01); *G06F 2212/283* (2013.01); *G06F 2212/7201* (2013.01)

(58) Field of Classification Search
CPC ............... G06F 12/0238; G06F 12/128; G06F 12/0891; G06F 12/0246; G06F 12/1009;
(Continued)

(56) References Cited

U.S. PATENT DOCUMENTS

2004/0177269 A1* 9/2004 Belnet ................. G06F 12/1491
713/190
2010/0058002 A1* 3/2010 Voll ....................... G06F 3/0689
711/E12.002
(Continued)

FOREIGN PATENT DOCUMENTS

| CN | 104346294 A | 2/2015 |
| GB | 2396930 A | 7/2004 |
| WO | 2020020175 A1 | 1/2020 |

OTHER PUBLICATIONS

ISA/CN, International Search Report and Written Opinion of the International Searching Authority, App. No. PCT/CN2020/086039, dated Jan. 20, 2021, National Intellectual Property Administration, 6 Xitcucheng Rd., Jimen Bridge, Haidian District, Beijing, 9 pgs.
(Continued)

*Primary Examiner* — Tracy C Chan
(74) *Attorney, Agent, or Firm* — Holland & Hart LLP

(57) ABSTRACT

Methods, systems, and devices for mapping descriptors for read operations are described. A memory device may include a first cache may include a mapping table between the logical addresses and the physical addresses, and a second cache may include one or more descriptors of one or more physical addresses of the memory array. A descriptor may include a starting logical address, a starting physical address, and a quantity of addresses in the descriptor, and may be configured to identify addresses or sets of address that are frequently accessed. When an access command (e.g., a read command) is received, the first cache may be queried and then the second cache may be queried (if there is a cache miss at the first cache). The physical address of the data of the memory array may be determined (and accessed) based on the descriptors stored in the second cache.

25 Claims, 6 Drawing Sheets

(58) Field of Classification Search
CPC ....... G06F 2212/283; G06F 2212/7201; G06F 2212/1021; G06F 2212/60
See application file for complete search history.

(56) References Cited

U.S. PATENT DOCUMENTS

| | | | | |
|---|---|---|---|---|
| 2012/0215965 | A1* | 8/2012 | Inada | G06F 12/0246 711/E12.017 |
| 2012/0221774 | A1* | 8/2012 | Atkisson | G06F 12/0895 711/135 |
| 2014/0208062 | A1* | 7/2014 | Cohen | G06F 3/0688 711/206 |
| 2015/0169465 | A1* | 6/2015 | Slepon | G06F 12/0246 711/103 |
| 2017/0364446 | A1* | 12/2017 | Pham | G06F 12/1027 |
| 2018/0018100 | A1* | 1/2018 | Aho | G06F 3/064 |
| 2019/0278716 | A1 | 9/2019 | Cho et al. | |
| 2019/0339978 | A1 | 11/2019 | Wallach | |
| 2020/0250098 | A1* | 8/2020 | Ma | G06F 12/0846 |
| 2020/0301847 | A1* | 9/2020 | Miura | G06F 12/0246 |

OTHER PUBLICATIONS

European Patent Office, "Supplementary European search report," issued in connection with European Patent Application No. 20932448.2 dated May 23, 2023 (12 pages).

* cited by examiner

MAPPING DESCRIPTORS FOR READ OPERATIONS

CROSS REFERENCE

The present Application for Patent is a 371 national phase filing of International Patent Application No. PCT/CN2020/086039 by DUAN et al., entitled "MAPPING DESCRIPTORS FOR READ OPERATIONS," filed Apr. 22, 2020, assigned to the assignee hereof, and expressly incorporated by reference herein.

BACKGROUND

The following relates generally to one or more memory systems and more specifically to mapping descriptors for read operations.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
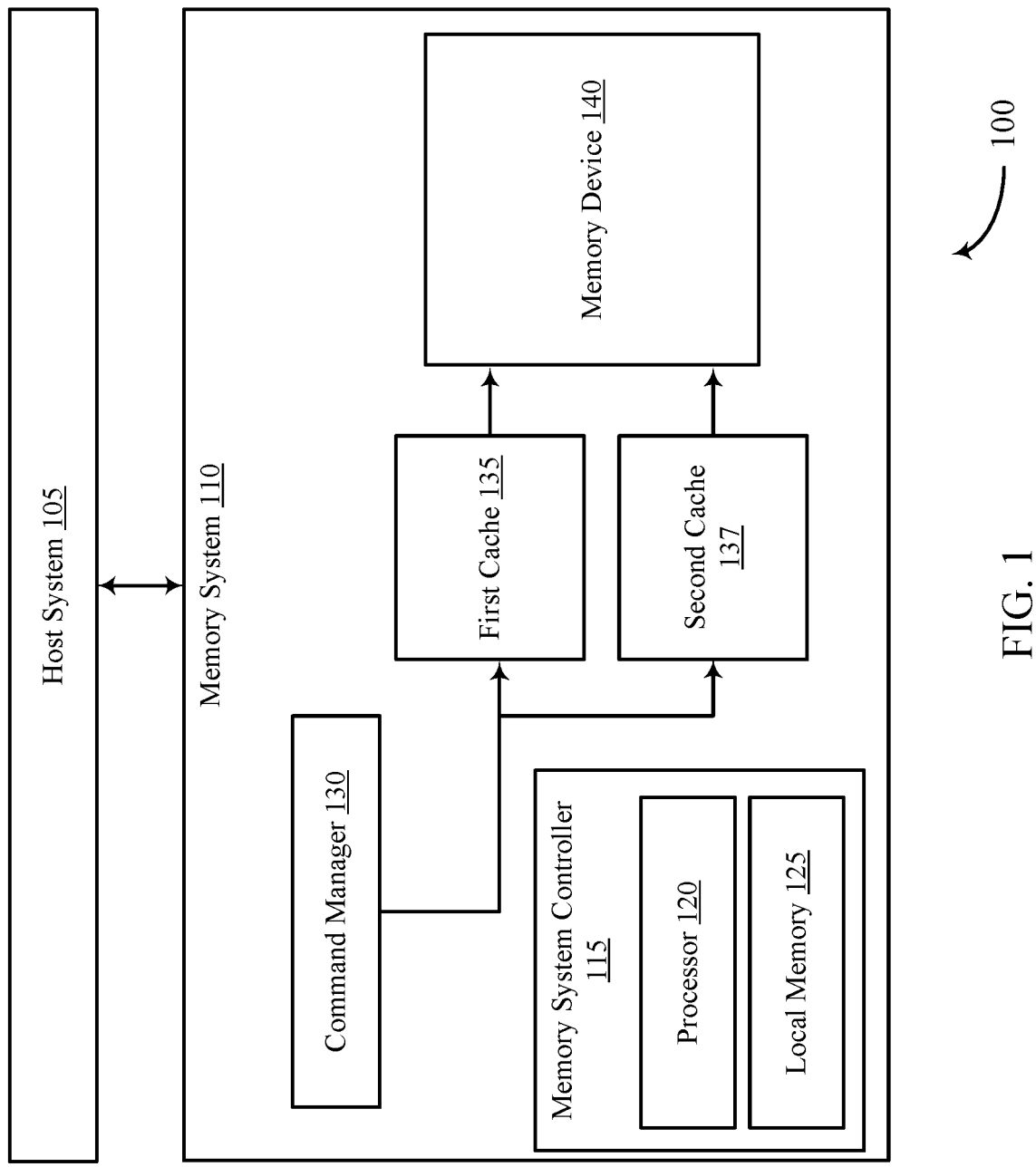
FIG. 1 illustrates an example of a computing environment that supports mapping descriptors for read operations in accordance with examples as disclosed herein.

Aspects of the present disclosure relate to mapping descriptors for read operations of a memory device. A memory device can be a non-volatile memory device that includes non-volatile memory cells, such as flash memory cells (e.g., not-and (NAND) memory cells). The memory device may consist of one or more physical blocks that can contain valid data, invalid data, or no data. Each memory cell in a physical block may be associated with a physical address.

When the memory device receives an access command (e.g., a read command), the command may include a logical address, such as a logical address referenced by a host system in a physical to logical (P2L) mapping table. The memory device may store a mapping table for translating a received logical address to a physical address in order to access the associated memory cell(s). The mapping table may be stored in a designated volatile memory (e.g., a cache) of the memory device. Because memory devices often include large quantities of memory cells, the mapping table for mapping each physical address to a corresponding logical address may be large. This, in turn, may use a relatively large cache storage. Moreover, some implementations (e.g., mobile memory devices) may include a relatively small volatile memory and it may not be feasible to load an entire P2L mapping table into the volatile cache. Accordingly, it may be desirable to reduce the size of the cache required for mapping physical addresses to logical addresses which, in turn, may reduce the overall power consumption of the memory device.

According to the techniques described herein, the power consumption and cache size (e.g., for storing a mapping table) of a memory device may be reduced. The memory device may include a first cache (e.g., a mapping page cache (MPC)) configured to store a mapping table for a portion of the physical addresses of the memory device, and a second cache (e.g., a mapping descriptor cache (MDC)) for storing entries (e.g., compressed mapping data) associated with logical addresses and physical addresses of the memory device. The entries may be referred to as descriptors and may include a starting logical address, starting physical address, and quantity of addresses of the entry in the second cache.

When the memory device receives an access command (e.g., a read command) for data stored at a memory array of the memory device, a memory controller may determine whether the associated logical address is stored in the MPC. If the logical address is not stored in the MPC, the memory controller may determine whether the associated logical address is stored in the MDC. The memory controller may determine whether the logical address is stored in the MDC using the starting logical address and the quantity of addresses in the entry. Based on the logical address being stored in the MDC, the memory controller may determine the associated physical address and read the data from the memory array.

In other examples, the memory controller may be configured to generate and store descriptors to the MDC. The descriptor may be generated based on various criteria, such as how frequently the data is accessed and a quantity of physical addresses to be included in the descriptor. The starting logical address, starting physical address, and length fields in the descriptor may represent a relatively small quantity of data, which may allow for the size of the MPC and MDC to be smaller. The smaller cache sizes may reduce the overall power consumption of the memory device.

Features of the disclosure are initially described in the context of a memory system as described with reference to FIG. 1. Features of the disclosure are described in the context of flow diagrams as described with reference to FIGS. 2 and 3. These and other features of the disclosure are further illustrated by and described with reference to an apparatus diagram and flowcharts that relate to mapping descriptors for read operations as described with reference to FIGS. 4-6.

FIG. 1 is an example of a computing environment 100 that supports mapping descriptors for read operations in accordance with examples of the present disclosure. The computing environment 100 may include a memory system 110 that may include media, such as one or more non-volatile memory devices (e.g., memory device 140). The memory system 110 may include a first cache 135 and a second cache 137 coupled with the memory device 140. The first cache 135 and second cache 137 may be configured to store entries for mapping logical addresses to physical addresses of the memory device 140.

A memory system 110 may be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 may include a host system 105 that is coupled to one or more memory systems 110. In some examples, the host system 105 may be coupled to different types of memory system 110. The host system 105 may use the memory system 110, for example, to write data to the memory device 140 and read data from the memory device 140. As used herein, "coupled to" or "coupled with" generally refers to a connection between components or devices, which may be an indirect communicative connection or direct communicative connection (e.g., without intervening components or devices), whether wired or wireless, including connections such as electrical, optical, magnetic, etc.

The host system 105 may be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes a memory and a processing device. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface may be used to transmit data between the host system 105 and the memory system 110. The physical host interface may provide an interface for passing control, address, data, and other signals between the memory system 110 and the host system 105.

The memory devices may include any combination of the different types of non-volatile memory devices and/or volatile memory devices. The volatile memory devices (e.g., memory device 140) may be, but are not limited to, random access memory (RAM), such as dynamic random access memory (DRAM) and synchronous dynamic random access memory (SDRAM). In the present example illustrated by FIG. 1, the memory device 140 may be a non-volatile memory device such as a NAND memory device. In such an example, the memory device 140 may not include any volatile memory (e.g., DRAM). However, it should be recognized that in other examples, the memory device 140 may include volatile and/or non-volatile memory.

Some examples of non-volatile memory devices (e.g., memory device 140) include not-and (NAND) type flash memory and write-in-place memory, such as three-dimensional cross-point ("3D cross-point") memory. A cross-point array of non-volatile memory may perform bit storage based on a change of bulk resistance, in conjunction with a stackable cross-gridded data access array. Additionally, in contrast to many flash-based memories, cross-point non-volatile memory may perform a write in-place operation, where a non-volatile memory cell may be programmed without the non-volatile memory cell being previously erased.

The memory system controller 115 (or controller 115 for simplicity) can communicate with the memory device 140 and/or the local memory 125 to perform operations such as reading data, writing data, or erasing data. The memory system controller 115 may include hardware such as one or more integrated circuits and/or discrete components, a buffer memory, or a combination of such. The hardware may include a digital circuitry with dedicated (i.e., hard-coded) logic to perform the operations described herein. The memory system controller 115 may be a microcontroller, special purpose logic circuitry (e.g., a field programmable gate array (FPGA), an application specific integrated circuit (ASIC), etc.), or other suitable processor.

The memory system controller 115 may include a processor 120 (e.g., a processing device) configured to execute instructions stored in a local memory 125. In the illustrated example, the local memory 125 of the memory system controller 115 includes an embedded memory configured to store instructions for performing various processes, operations, logic flows, and routines that control operation of the memory system 110, including handling communications between the memory system 110 and the host system 105.

In some examples, the local memory 125 may include memory registers storing memory pointers, fetched data, etc. The local memory 125 may also include read-only memory (ROM) for storing micro-code. While the example memory system 110 in FIG. 1 has been illustrated as including the memory system controller 115, in another example of the present disclosure, a memory system 110 may not include a memory system controller 115, and may instead rely upon external control (e.g., provided by an external host, or by a processor or controller separate from the memory system).

The memory system controller 115 may receive commands or operations from the host system 105 and may convert the commands or operations into instructions or appropriate commands to achieve the desired access to the memory device 140. The memory system controller 115 may be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory device 140. The memory system controller 115 may further include host interface circuitry to communicate with the host system 105 via the physical host interface. The host interface circuitry may convert the commands received from the host system into command instructions to access the memory device 140 as well as convert responses associated with the memory device 140 into information for the host system 105.

In some examples, the memory device 140 may include one or more local media controllers (not shown) that operate in conjunction with memory system controller 115 to execute operations on one or more memory cells of the memory device 140. An external controller (e.g., memory system controller 115) may externally manage the memory device 140 (e.g., perform media management operations on the memory device 140). In some examples, the memory device 140 may be a locally managed memory devices, which is a memory device combined with a local media controller that performs memory management operations on the memory device 140 within the same memory device package.

In some examples, the memory system 110 may include a command manager 130, such as a flash translation layer (FTL) that may be configured as an interface between the host system 105 and the memory device 140. The command manager 130 may be included in the memory system controller 115 (e.g., the memory system controller 115 may perform the functions performed by the command manager 130 as described herein). In some implementations, the commands and signaling scheme used by the host system 105 may be different than the command and signaling scheme used by the memory device 140. To facilitate communications between the host system 105 and the memory device 140 that stores data on behalf of the host system, the command manager 130 can translate or otherwise convert host system 105 information to memory device 140 information and vice-versa. One or more cores may be used to perform the functions of the command manager 130. For example, one or more cores may be used to implement the functions of the command manager 130. In some examples, these cores may be dedicated to performing the functions of the command manager 130.

In some examples, the memory system 110 may include a first cache 135 (e.g., a mapping page cache). The first cache 135 may communicate with the command manager 130 during an access operation on the memory device 140. For example, the memory device 140 may include one or more NAND memory cells. Since NAND memory cells cannot be updated in place, the command manager 130 may write data to a new page and mark the previous page as invalid. Therefore, an address mapping table may be used to translate logical addresses (provided by the host system 105) to physical flash address. In some cases, the first cache 135 may store a portion of an address mapping table. Additionally or alternatively, the remainder of the address mapping table (e.g., the entire address mapping table may be stored to the memory device 140).

In some examples, the address mapping table (e.g., of the first cache 135) may be classified as a page-level, block-level, or hybrid schemes. A page-level scheme translates a logical page number (LPN) to a physical page number (PPN) in flash memory. A block-level scheme may lower the overall memory requirement by translating logical block numbers (LBNs) to physical block numbers (PBNs). A hybrid scheme may include one or more portions of both the page-level and block-level mapping schemes.

When using a page-level scheme, the size of the first cache 135 may be relatively large in order to store the mapping table. As described herein, however, it may be beneficial to reduce the overall size of the memory system 110 and associated power usage, thus it may be beneficial to reduce the overall size of the first cache 135.

In some examples, the size of the first cache 135 may be reduced by caching entries stored to the first cache 135. When caching the entries, the entries utilized by the mapping table may be stored in flash memory (e.g., the memory device 140 or another memory device), and the mapping pages (e.g., the units stored in the first cache 135) may be loaded to the first cache 135 when needed.

For a read operation, when the memory system 110 receives a read command (e.g., at the command manager 130) from the host system 105, the memory system 110 may be used to determine the physical page address of the logical page. To determine the physical page, the memory system 110 may look to the first cache 135. If the associated physical address is stored in the MPC, the physical address may be retrieved, and the data can be read from the memory device 140 according to the physical address. If the physical page is not stored to the first cache 135, the memory system 110 may read the corresponding mapping page from a mapping table (e.g., a L2P table) stored to the flash memory (e.g., stored in a dedicated portion of the memory device 140 or another memory device) to the mapping cache before reading the data from the memory device 140 according to the physical address. As described herein, the memory system 110 may include a second cache 137 (e.g., a mapping descriptor cache) to reduce the size of the first cache 135 and reduce the frequency of cache misses where the memory system controller 115 would need to access the mapping table to find the corresponding physical location associated with an access command.

In some examples, second cache 137 may communicate with the first cache 135 and/or the command manager 130 during an access operation on the memory device 140. As shown in FIG. 1, the first cache 135 and the second cache 137 may be two different (e.g. separate) caches. However, in other examples (not shown) the first cache 135 and second cache 137 may reside in a same cache and/or may be implemented using local memory 125. For example, the first cache 135 and second cache 137 may be different partitions of a same cache of memory cells.

The second cache 137 may be configured to store descriptors associated with sets of addresses of the memory device 140 that are accessed frequently. In some cases, sets or blocks of addresses of the memory device 140 may be accessed frequently together. Such sets of consecutive addresses may be reduced to a descriptor and the descriptor may be stored in a cache. For example, each entry stored to the second cache 137 may consist of a starting logical address, starting physical address, and/or a length field (e.g., indicating a quantity of addresses in the descriptor). When a read command is received by the memory system 110, the associated logical address may be compared to the range of logical addresses stored to the second cache 137 (e.g., the logical address will be compared to the range of logical addresses based on the stored starting logical address and length field). If the logical address is within a range stored to the second cache 137, the associated physical address may be determined, and the data may be read from memory device 140 according to the physical address. Thus, when a read command is received, the memory system controller 115 may check the first cache 135 and the second cache 137 for the associated logical address.

In some examples, the second cache 137 may be configured to store entries associated with frequently accessed (e.g., hot) data of the memory device 140. Though the memory device 140 can store multiple pages of data, most pages are relatively infrequently accessed (e.g., cold). The purpose of this patent is to improve the hot data access speed, as the latency and performance of the hot data access contribute much to the user experience. To track the temperature of data, the memory device 140 may be divided (e.g., logically divided) into sub LBA ranges. For example, a 128 GB storage device is may be divided into 128 1 GB-sub LBA ranges.

When the memory system 110 receives a read command, the controller 115 may identify the corresponding LBA range to be read and increase a read count of the LBA range. One LBA read may correspond to one read count increase. As the read count increases, the hotter the data may be. Mappings of a certain threshold of frequently accessed data (e.g., a quantity of the most frequently accessed data) may be stored to the second cache 137 at any one time. As different data becomes more (or less) frequently accessed over time, the entries stored to the second cache 137 may be updated (e.g., removed and replaced by a different entry). By using a second cache 137 in the memory system, the size of the first cache 135 may be reduced, and may the overall power consumption and size of the memory system 110.

The memory system 110 may also include additional circuitry or components that are not illustrated. In some examples, the memory system 110 may include additional caches, memory devices (e.g., DRAM), and address circuitry (e.g., a row decoder and a column decoder) that may receive an address from the memory system controller 115 and decode the address to access the memory device 140.

In other examples, the memory system 110 may include non-transitory computer-readable-media (CRM) (e.g., the local memory 125 and/or the memory device 140) storing instructions (e.g., firmware) for performing the methods for mapping descriptors (e.g., methods 200, 300, 500, and 600), described herein. For example, the instructions, when executed by the memory system controller 115 (or the processor 120 of the memory system controller 115), may cause the memory system controller 115 to perform the methods for mapping descriptors described herein.

Figure 2:
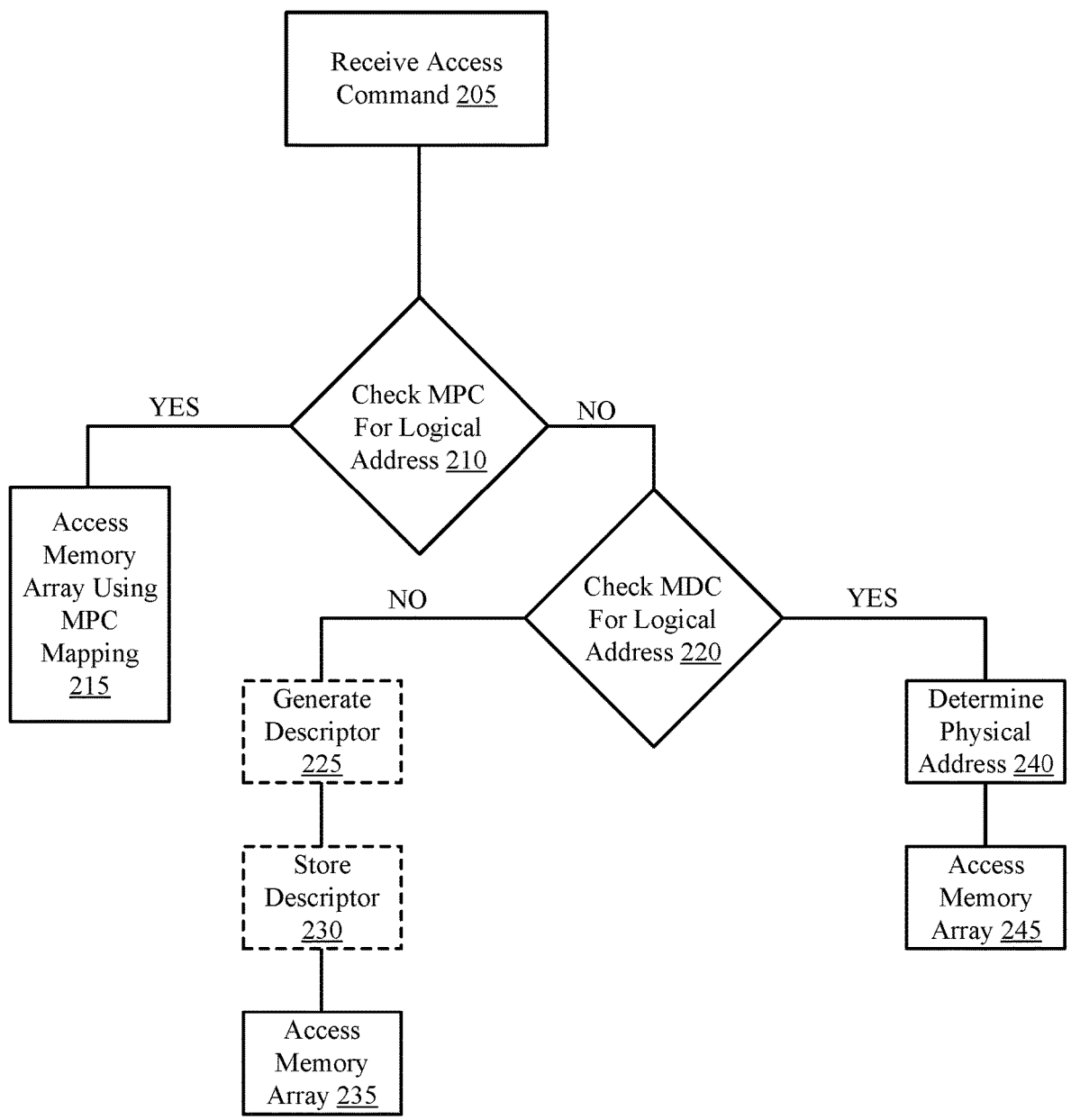
FIGS. 2 and 3 illustrate examples of process flow diagrams that support mapping descriptors for read operations in accordance with examples as disclosed herein.

FIG. 2 illustrates an example of a flow diagram 200 that supports mapping descriptors for read operations in accordance with examples as disclosed herein. The flow diagram 200 may illustrate operations of a host system (e.g., a host system 105 as described with reference to FIG. 1) and a memory system (e.g., a memory system 110 as described with reference to FIG. 1). The memory system may include a controller, a first cache (e.g., a mapping page cache or MPC), a second cache (e.g., a mapping descriptor cache or MDC), and a memory array. The components of the memory system may be examples of the associated components of a memory system as discussed with reference to FIG. 1. The flow diagram 200 may illustrate the memory system receiving a read command (e.g., from the host system) and utilizing the MDC to access one or more memory cells of the memory array. As described herein, the MDC may include one or more mapping entries (e.g., compressed mapping entries), which may reduce the overall power consumption and size of the memory array.

At 205, an access command may be received. In some examples, a memory device may receive the access command from a host system. The access command may be, for example, a read command that includes a logical address (e.g., a logical block address) for one or more memory cells of a memory array. The read command may be received and processed by a controller, such as a memory system controller 115 as described with reference to FIG. 1. The controller may determine a physical address of the memory array to access based on receiving the read command. The controller may utilize one or more entries (e.g., descriptors) stored in an MDC to determine the physical address of the memory array and access the associated data.

At 210, it may be determined whether the logical address associated with the access command is stored at the MPC. In some examples, the controller may determine whether the logical address associated with the access command is stored at the MPC. As discussed herein, the MPC may include a mapping table (e.g., a portion of a mapping table) between logical addresses and physical addresses of the memory array. The controller may ultimately utilize the MDC based on the logical address not being included (e.g., stored) in the MPC.

At 215, if the logical address associated with the access command is stored at the MPC, a physical address of the memory array associated with the logical address of the access command may be determined. In some examples, the controller may determine a physical address of the memory array associated with the logical address of the access command. For example, the mapping table (e.g., the portion of the mapping table) of the MPC may include entries (e.g., rows) that map logical addresses to physical addresses. Thus, if the logical address is stored to the MPC, the controller may determine the associated physical address based on the table entry. Upon determining the physical address of the memory array, the controller may retrieve (e.g., access) the data stored to the respective physical address of the memory array. In some examples, the controller may provide (e.g., transmit) the retrieved data to the host system.

At 220, if the logical address associated with the access command is not stored at the MPC, it may be determined whether the logical address associated with the access command is stored at the MDC. In some examples, the controller may determine whether the logical address associated with the access command is stored at the MDC. As discussed herein, the MDC may include entries (e.g., compressed entries) referred to as descriptors. Each descriptor may include a starting logical address, a starting physical address, and/or a length field that indicates the length of the respective entry. Table 1, which is shown below, illustrates example descriptors saved to the MDC.

TABLE 1

| Starting LPN | Starting PPN | Length |
|---|---|---|
| 100 | 20 | 128 |
| 500 | 200 | 2 |

The first entry illustrates, for example, a starting logical address (logical page number (LPN)) "100" and a length of 128. Similarly, the second entry illustrates a starting logical address "500" and a length of 2. Thus, the first entry may represent logical addresses 100 through 228 and the second entry may represent logical addresses 500 through 502. Thus in such an example, at 220 the controller may determine whether the logical address of the received access command falls within either range of logical addresses by using at least the starting logical address and length fields.

At 225, if the logical address associated with the access command is not stored at the MDC, a descriptor that includes at least the logical address and a corresponding physical address may be generated. In some examples, the controller may optionally generate a descriptor that includes at least the logical address and a corresponding physical address. The memory address may determine a physical address associated with the logical address based on one or more prior access operations. In some examples, the descriptor may be generated based on the memory system (e.g., the controller) receiving a plurality of write commands having sequential logical addresses. In such an example, the starting logical address may be based on the first logical address in the sequence, and the length field may be based on the quantity of logical addresses included in the sequence.

In some examples, a descriptor may be generated using the MPC. In some examples, the controller may generate a descriptor using the MPC. For example, the controller may load a page of physical addresses of the memory array to the MPC. The controller may generate one or more descriptors to store to the MDC based on the page of physical addresses. Additional details regarding generation of the descriptor are with reference to FIG. 4.

At 230, the generated descriptor may optionally be stored to the MDC. In some examples, the controller may optionally store the generated descriptor to the MDC. As discussed herein (e.g., with reference to FIG. 4), the descriptor may be stored to the MDC based on one or more criteria. For example, the descriptor may be stored to the MDC based on the associated data (e.g., the associated physical addresses of the data) being accessed a threshold quantity of times. The controller may, for example, track a quantity of access operations performed on a subset (e.g., a range) of logical addresses. When a subset of logical addresses undergoes a threshold quantity of access operations, an associated descriptor may be generated and stored to the MDC.

In other examples, the descriptor may be stored to the MDC based on the length (e.g., the quantity logical addresses and/or corresponding physical addresses in the entry) satisfying a threshold value. The controller may, for example, determine a length of a generated descriptor based on the length field. A descriptor having a length that satisfies the threshold quantity may be stored to the MDC. Additional details regarding storing a descriptor to the MDC are with reference to FIG. 4.

At 235, the memory array may be accessed. In some examples, the controller may access the memory array. In some cases, the controller may skip the features of 225 and 230 and go straight to 235 if the MDC does not include the logical address. The controller may retrieve (e.g., access) the data stored to a physical address associated with a logical address of the generated (and stored) descriptor. In some examples, the controller may provide (e.g., transmit) the retrieved data to the host system At 240, if the logical address associated with the access command is stored at the MDC, a physical address of the memory array associated with the logical address of the access command may be determined. In some examples, the controller may determine a physical address of the memory array associated with the logical address of the access command. For example, as described with reference to Table 1, the MDC may include entries that include a starting logical address, a starting physical address, and/or a length field that indicates the length of the respective entry. To determine whether the logical address is stored to the MDC, the controller may determine whether the logical address of the received access command falls within a range of logical addresses by using at least the starting logical address and length fields.

When it is determined that the logical address is included in a range of stored descriptors, the corresponding physical address may be calculated. To calculate the physical address, the position of the logical address in the sequence may be determined. For example, the logical address may be "103," which may be fourth (4th) in the order of logical addresses. Because the starting physical address may be "20," the controller may determine (e.g., calculate) that the corresponding physical address is "23." The corresponding physical address for any logical address included in a descriptor stored to the MDC may be determined.

At 245, upon determining the physical address of the memory array corresponding to the received logical address, the data stored to the respective physical address of the memory array may be retrieved. In some examples, the controller may retrieve (e.g., access) the data stored to the respective physical address of the memory array. In some examples, the controller may provide (e.g., transmit) the retrieved data to the host system.

Figure 3:
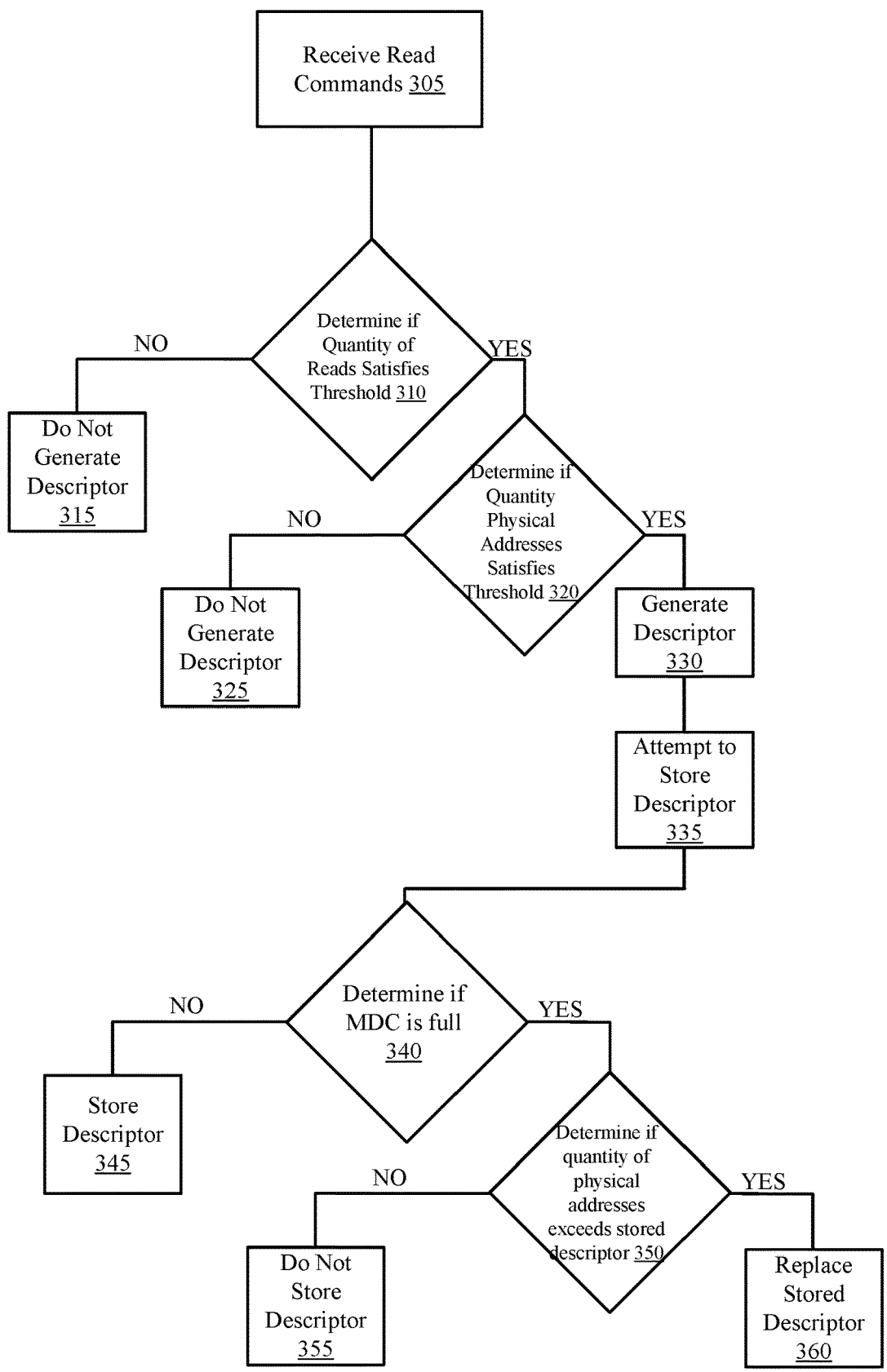

FIG. 3 illustrates an example of a flow diagram 300 that supports mapping descriptors for read operations in accordance with examples as disclosed herein. The flow diagram 300 may illustrate operations of a host system (e.g., a host system 105 as described with reference to FIG. 1) and a memory system (e.g., a memory system 110 as described with reference to FIG. 1). The memory system may include a controller, a first cache (e.g., a mapping page cache), a second cache (e.g., a mapping descriptor cache), and a memory array. The components of the memory system may be examples of the associated components of a memory system as discussed with reference to FIGS. 1 and 2. The flow diagram 300 may illustrate the memory system receiving a plurality of read commands (e.g., from the host system) and determining whether to generate and/or store an entry (e.g., a descriptor) to the MDC. As discussed herein, the entries stored to the MDC may reduce the overall power consumption and size of the memory array.

At 305, a plurality of access commands may be received. In some examples, a memory device may receive a plurality of access commands from a host system. The access commands may be, for example, read commands that each include a logical address (e.g., a logical block address) for one or more memory cells of a memory array. The read commands may be received and processed by a controller, such as a memory system controller 115 as described with reference to FIG. 1. In some examples, the memory array may be divided (e.g., logically sub-divided) into one or more sub-blocks that are each associated with a range of logical addresses. The controller may track a quantity of access operations performed on each sub-block. For example, when a single read command is received for a logical address within a sub-block, the controller may increment value of access operations performed on the sub-block (e.g., using a counter).

At 310, it may be determined whether a quantity of read operations performed on a sub-block of the memory array satisfies a threshold value. In some examples, the controller may determine whether a quantity of read operations performed on a sub-block of the memory array satisfies a threshold value (e.g., a first threshold value). The quantity of read operations performed on a sub-block may indicate whether the sub-block is frequently accessed (e.g., whether it contains "hot" data). It may be desirable to generate a descriptor associated with hot data to reduce latency associated with a future access operation for the data, and to avoid using the MPC for determining a physical address associated with the data. In some examples, the threshold quantity may be a configurable (e.g., adjustable) quantity based desired design parameters for the memory system. A descriptor for one or more logical addresses included within the sub-block may be generated if the quantity of read operations satisfies the threshold value.

At 315, if the quantity of read operations performed on the sub-block of the memory array does not satisfy the threshold value (e.g., the quantity falls below the threshold value) then a descriptor for any logical address included within the sub-block may be refrained from being generated. In some examples, the controller may refrain from generating a descriptor for any logical addresses included within the sub-block. The controller may, at another time, determine (e.g., redetermine) whether the quantity of read operations satisfies the threshold value.

At 320, based on the quantity of read operations performed on the sub-block satisfying the threshold, it may be determined whether a quantity of physical addresses of the sub-block satisfies a threshold value (e.g., a second threshold value). In some examples, the controller may determine whether a quantity of physical addresses of the sub-block satisfies a threshold value (e.g., a second threshold value). When the quantity of read operations satisfies the first threshold, the controller may read the data from the associated sub-block of the memory array. For example, the controller may read the physical addresses associated with each logical address included in the sub-block. As the controller reads the data, it may identify (e.g., track) groups of consecutive physical addresses. Each group of consecutive physical addresses may be compared against the second threshold value, which may be a configurable (e.g., adjustable) value based desired design parameters for the memory system. A descriptor for one or more logical addresses included within the sub-block may be generated if the quantity of consecutive physical addresses satisfies the second threshold value.

At 325, if the quantity of consecutive physical addresses read from the memory array does not satisfy the second threshold value (e.g., the quantity falls below the second threshold value) then the descriptor for the corresponding logical addresses included within the sub-block may be refrained from being generated. In some examples, the controller may refrain from generating a descriptor for the corresponding logical addresses included within the sub-block. The controller may, at another time, determine (e.g., redetermine) whether a quantity of consecutive physical addresses satisfies the second threshold value.

At 330, based on the quantity of consecutive physical addresses satisfying the second threshold, a descriptor for storing at the MDC may be generated. In some examples, the controller may generate a descriptor for storing at the MDC. The descriptor may include a starting logical address, starting physical address, and/or length of the descriptor. The generated descriptor may be stored to the MDC.

At 335, the generated descriptor may be attempted to be stored to the MDC. In some examples, the controller may attempt to store the generated descriptor to the MDC. In some cases, the MDC may be full (e.g., full of one or more stored descriptors) and the generated descriptor may or may not be stored. Whether the generated descriptor is stored may depend on whether the MDC is full and whether the length of the descriptor is greater than (or less than) the length of any one descriptor stored to the MDC. In some instances, a stored MDC may be overwritten (e.g., deleted and replaced by a generated descriptor).

At 340, it may be determined whether the MDC is full. In some examples, the controller may determine whether the MDC is full. In some examples, the MDC may be configured to store a finite quantity of descriptors. In such an example, the controller may determine whether the MDC contains the finite quantity of descriptors or whether an additional descriptor may be stored. In other examples, the MDC may be configured to store a finite quantity of data (e.g., a finite quantity of bytes). IN such an example, the controller may determine whether the MDC contains enough space to store the size of the generated descriptor.

At 345, it may be determined that the MDC is not full. In some examples, the controller may determine that the MDC is not full. Based on the MDC having available space to store one or more descriptors, the controller may store the generated descriptor to the MDC. The stored MDC may be used to determine a physical address of the memory array based on the memory system receiving an access command that includes a logical address.

At 350, it may be determined that the MDC is full and whether the length of the generated descriptor exceeds a length of any stored descriptors may be generated. In some examples, the controller may determine that the MDC is full and may determine whether the length of the generated descriptor exceeds a length of any stored descriptors. Entries may be stored to the MDC based on their length. For example, entries may be stored in the MDC in descending order and the controller may be configured to compare the size of the generated descriptor to the smallest entry. If the generated descriptor is larger than the smallest entry, the smallest entry will be removed from the MDC and the generated descriptor will be stored.

At 355, the size of the generated descriptor may not be larger than any of the descriptors stored to the MDC. In such an example, the generated descriptor may not be stored to the MDC. In such an example, the previously stored entries in the MDC will remain stored in the MDC.

At 360, the size of the generated descriptor may be larger than a smallest descriptor stored to the MDC. In such an example, the smallest descriptor stored to the MDC may be removed (e.g., deleted) and the generated descriptor may be stored to the MDC. The controller may store the generated descriptor to the MDC according to its size, so that the MDC is organized according to the size of the stored descriptors. The stored descriptors may be used to determine a physical address of the memory array based on the memory system receiving an access command that includes a logical address. Utilizing the MDC may reduce the overall power consumption and size of the memory device that would otherwise be incurred due to using only the MPC to determine physical addresses of the memory array.

Figure 4:
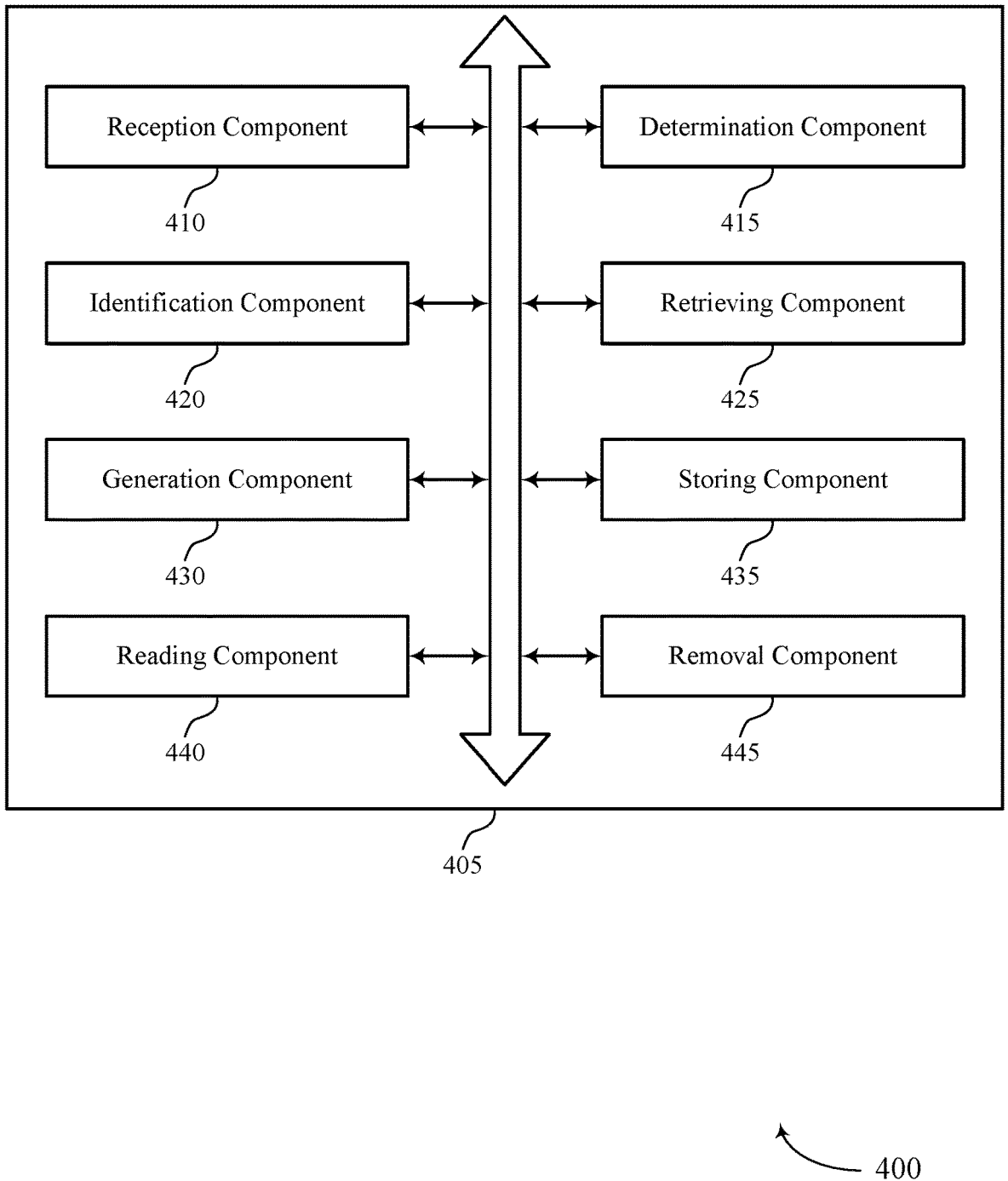
FIG. 4 shows a block diagram of a memory device that supports mapping descriptors for read operations in accordance with examples as disclosed herein.

FIG. 4 shows a block diagram 400 of a memory device 405 that supports mapping descriptors for read operations in accordance with examples as disclosed herein. The memory device 405 may be an example of aspects of a memory device as described with reference to FIGS. 1 through 3. The memory device 405 may include a reception component 410, a determination component 415, an identification component 420, a retrieving component 425, a generation component 430, a storing component 435, a reading component 440, and a removal component 445. Each of these modules may communicate, directly or indirectly, with one another (e.g., via one or more buses).

The reception component 410 may receive, at a memory device, a read command including a logical address of a memory array of data requested by the read command.

The determination component 415 may determine whether the logical address is absent from a first cache of the memory device, the first cache including mappings between a first set of logical addresses and of a first set of physical addresses of the memory array. In some examples, the determination component 415 may determine whether a quantity of read operations performed on a portion of a memory array satisfies a first threshold. In some examples, the determination component 415 may determine whether a quantity of physical addresses of the portion of the memory array satisfies a second threshold based on determining that the quantity of read operations satisfies the first threshold.

In some examples, the determination component 415 may determine a quantity of logical addresses of the subset of the second set of logical addresses. In some examples, the determination component 415 may determine that the logical address is included in the subset of the second set of logical addresses based on identifying the starting logical address of subset of the second set of logical addresses and determining the quantity of logical addresses in the subset of the second set of logical addresses. In some examples, the determination component 415 may determine a quantity of addresses in the subset of the second set of logical addresses that are between the starting logical address and the logical address requested by the read command.

In some examples, the determination component 415 may determine that the descriptor associated with the logical address of the read command is not stored in the second cache. In some examples, the determination component 415 may determine whether the cache is full based on attempting to store the second descriptor. In some examples, the determination component 415 may determine whether the quantity of physical addresses of the second portion of the memory array satisfies the quantity of physical addresses of the portion of the memory array. In some examples, the determination component 415 may determine whether the quantity of physical addresses of the second portion of the memory array does not satisfy the quantity of physical addresses of the portion of the memory array.

In some examples, the determination component 415 may determine whether a quantity of the continuous physical addresses satisfies the second threshold, where generating the descriptor is based on the quantity satisfying the second threshold. In some examples, the determination component 415 may determine continuous physical addresses of the portion of the memory array that satisfies the first threshold and the second threshold.

The identification component 420 may identify a descriptor associated with the logical address and that is stored in a second cache of the memory device based on determining that the logical address is absent from the first cache, the second cache including one or more descriptors between a second set of logical addresses and a second set of physical addresses of the memory array. In some examples, the identification component 420 may identify a starting logical address of a subset of the second set of logical addresses.

In some examples, the identification component 420 may identify a physical address associated with the logical address based on the descriptor stored in the second cache, where retrieving the data is based on identifying the physical address. In some examples, the identification component 420 may identify a starting logical address of a subset of the second set of logical addresses based on identifying the descriptor. In some examples, the identification component 420 may identify a starting physical address of a subset of the second set of physical addresses that are associated with the subset of the second set of logical addresses, where the physical address associated with the logical address requested by the read command is based on the identified starting physical address of the subset of the second set of physical addresses and the quantity of addresses between the starting logical address and the logical address requested by the read command.

In some examples, the identification component 420 may identify a portion of data having undergone the quantity of read operations that satisfies the first threshold. In some examples, the identification component 420 may identify physical addresses of the portion of data that satisfies the first threshold. In some examples, the identification component 420 may identify a portion of the physical addresses having continuous physical addresses based on identifying the physical addresses of the portion of data that satisfies the first threshold, where generating the descriptor is based on identifying the portion of the physical addresses having the continuous physical addresses.

The retrieving component 425 may retrieve the data from the memory array based on the descriptor stored in the second cache.

The generation component 430 may generate a descriptor for the portion of the memory array based on determining that the quantity of physical addresses of the portion of the memory array satisfies the second threshold. In some examples, the generation component 430 may generate the descriptor associated with the logical address and a corresponding physical address of the memory array based on determining that the descriptor associated with the logical address of the read command is not stored in the second cache. In some examples, the generation component 430 may generate a second descriptor for a second portion of the memory array based on the quantity of physical addresses of the second portion of the memory array satisfying the second threshold.

The storing component 435 may store the descriptor in a cache associated with the memory array. In some examples, the storing component 435 may store the descriptor to the second cache. In some examples, the storing component 435 may attempt to store the second descriptor in the cache associated with the memory array based on generating the second descriptor. In some examples, the storing component 435 may store the second descriptor in the cache based on removing the descriptor. In some examples, the storing component 435 may refrain from storing the second descriptor in the cache based on determining that the quantity of physical addresses of the second portion of the memory array does not satisfy the quantity of physical addresses of the portion of the memory array.

The reading component 440 may read a memory cell of the memory array that is associated with the identified physical address. In some examples, the reading component 440 may data associated with the quantity of read operations that satisfies the first threshold is accessed more frequently within a duration than data associated with a quantity of read operations that does not satisfy the first threshold.

The removal component 445 may remove the descriptor from the cache based on determining that the quantity of physical addresses of the second portion of the memory array satisfies the quantity of physical addresses of the portion of the memory array.

Figure 5:
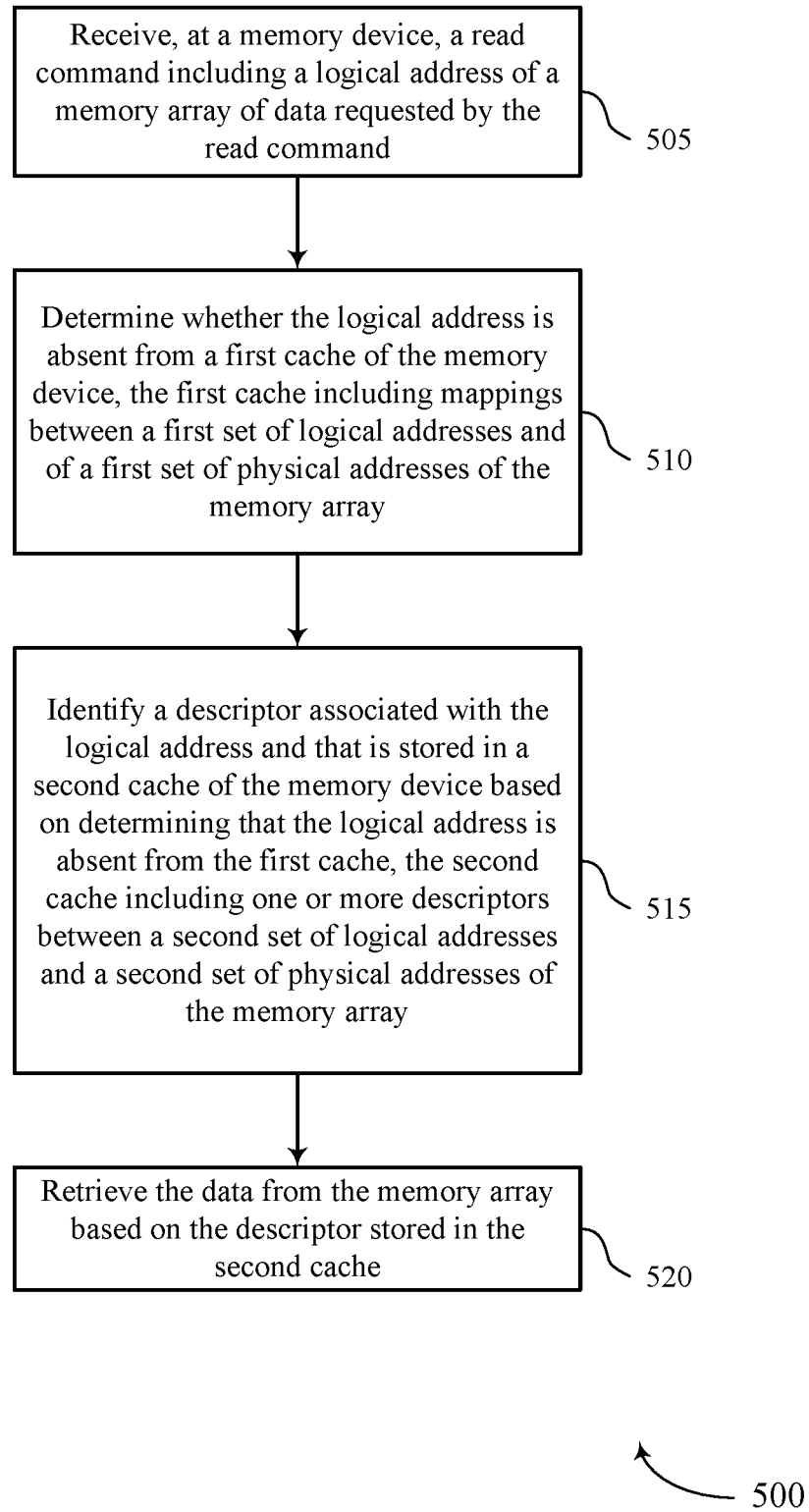
FIGS. 5 and 6 show flowcharts illustrating a method or methods that support mapping descriptors for read operations in accordance with examples as disclosed herein.

FIG. 5 shows a flowchart illustrating a method or methods 500 that supports mapping descriptors for read operations in accordance with examples as disclosed herein. The operations of method 500 may be implemented by a memory device or its components as described herein. For example, the operations of method 500 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 505, the memory device may receive, at a memory device, a read command including a logical address of a memory array of data requested by the read command. The operations of 505 may be performed according to the methods described herein. In some examples, aspects of the operations of 505 may be performed by a reception component as described with reference to FIG. 4.

At 510, the memory device may determine whether the logical address is absent from a first cache of the memory device, the first cache including mappings between a first set of logical addresses and of a first set of physical addresses of the memory array. The operations of 510 may be performed according to the methods described herein. In some examples, aspects of the operations of 510 may be performed by a determination component as described with reference to FIG. 4.

At 515, the memory device may identify a descriptor associated with the logical address and that is stored in a second cache of the memory device based on determining that the logical address is absent from the first cache, the second cache including one or more descriptors between a second set of logical addresses and a second set of physical addresses of the memory array. The operations of 515 may be performed according to the methods described herein. In some examples, aspects of the operations of 515 may be performed by an identification component as described with reference to FIG. 4.

At 520, the memory device may retrieve the data from the memory array based on the descriptor stored in the second cache. The operations of 520 may be performed according to the methods described herein. In some examples, aspects of the operations of 520 may be performed by a retrieving component as described with reference to FIG. 4.

In some examples, an apparatus as described herein may perform a method or methods, such as the method 500. The apparatus may include features, means, or instructions (e.g., a non-transitory computer-readable medium storing instructions executable by a processor) for receiving, at a memory device, a read command including a logical address of a memory array of data requested by the read command, determining whether the logical address is absent from a first cache of the memory device, the first cache including mappings between a first set of logical addresses and of a first set of physical addresses of the memory array, identifying a descriptor associated with the logical address and that is stored in a second cache of the memory device based on determining that the logical address is absent from the first cache, the second cache including one or more descriptors between a second set of logical addresses and a second set of physical addresses of the memory array, and retrieving the data from the memory array based on the descriptor stored in the second cache.

In some examples of the method 500 and the apparatus described herein, identifying the descriptor may include operations, features, means, or instructions for identifying a starting logical address of a subset of the second set of logical addresses, and determining a quantity of logical addresses of the subset of the second set of logical addresses.

Some examples of the method 500 and the apparatus described herein may further include operations, features, means, or instructions for determining that the logical address may be included in the subset of the second set of logical addresses based on identifying the starting logical address of subset of the second set of logical addresses and determining the quantity of logical addresses in the subset of the second set of logical addresses.

Some examples of the method 500 and the apparatus described herein may further include operations, features, means, or instructions for identifying a physical address associated with the logical address based on the descriptor stored in the second cache, where retrieving the data may be based on identifying the physical address.

In some examples of the method 500 and the apparatus described herein, identifying the physical address may include operations, features, means, or instructions for identifying a starting logical address of a subset of the second set of logical addresses based on identifying the descriptor, and determining a quantity of addresses in the subset of the second set of logical addresses that may be between the starting logical address and the logical address requested by the read command.

Some examples of the method 500 and the apparatus described herein may further include operations, features, means, or instructions for identifying a starting physical address of a subset of the second set of physical addresses that may be associated with the subset of the second set of logical addresses, where the physical address associated with the logical address requested by the read command may be based on the identified starting physical address of the subset of the second set of physical addresses and the quantity of addresses between the starting logical address and the logical address requested by the read command.

Some examples of the method 500 and the apparatus described herein may further include operations, features, means, or instructions for determining that the descriptor associated with the logical address of the read command may be not stored in the second cache, generating the descriptor associated with the logical address and a corresponding physical address of the memory array based on determining that the descriptor associated with the logical address of the read command may be not stored in the second cache, and storing the descriptor to the second cache.

In some examples of the method 500 and the apparatus described herein, retrieving the data from the memory array may include operations, features, means, or instructions for reading a memory cell of the memory array that may be associated with the identified physical address.

Figure 6:
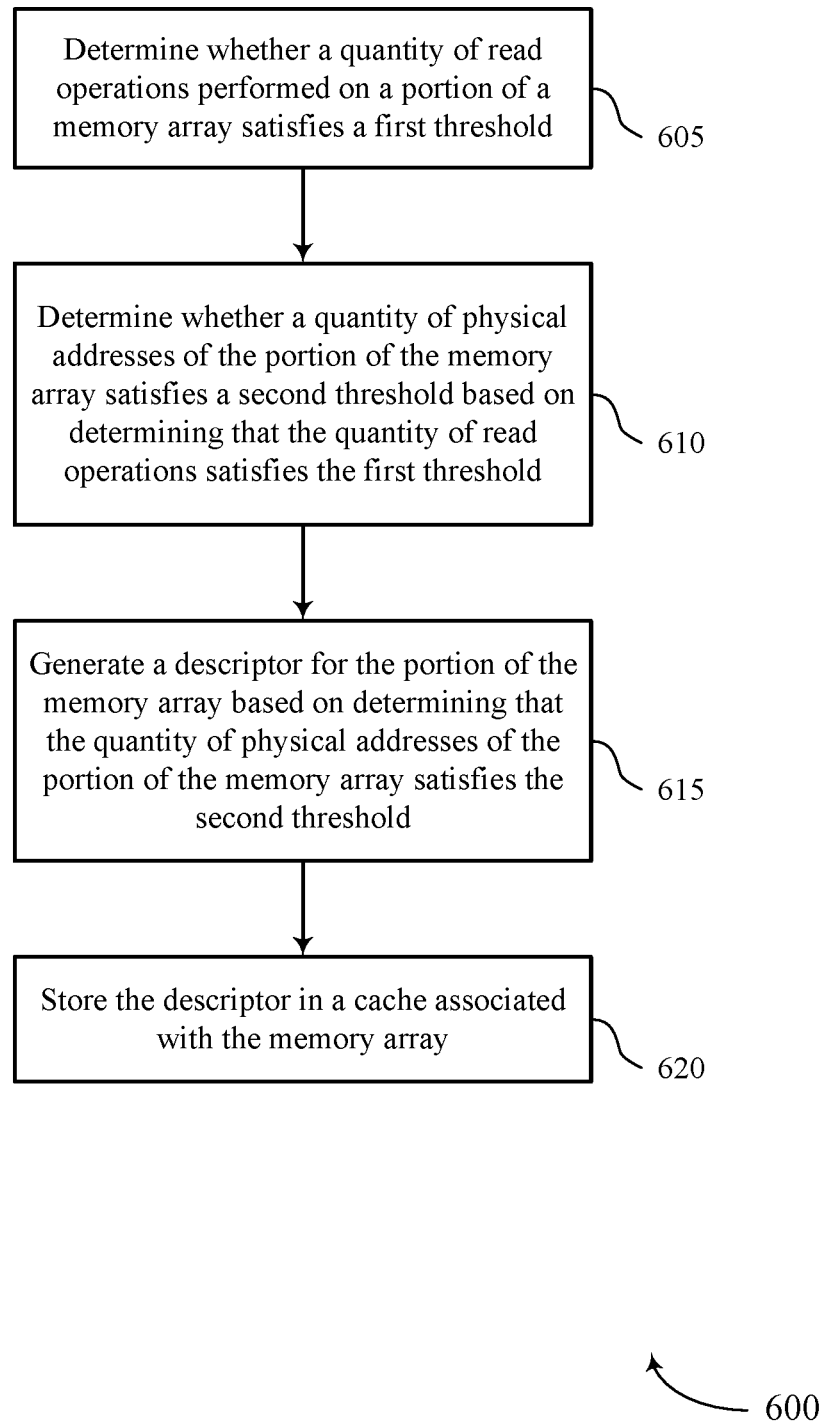

FIG. 6 shows a flowchart illustrating a method or methods 600 that supports mapping descriptors for read operations in accordance with examples as disclosed herein. The operations of method 600 may be implemented by a memory device or its components as described herein. For example, the operations of method 600 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 605, the memory device may determine whether a quantity of read operations performed on a portion of a memory array satisfies a first threshold. The operations of 605 may be performed according to the methods described herein. In some examples, aspects of the operations of 605 may be performed by a determination component as described with reference to FIG. 4.

At 610, the memory device may determine whether a quantity of physical addresses of the portion of the memory array satisfies a second threshold based on determining that the quantity of read operations satisfies the first threshold. The operations of 610 may be performed according to the methods described herein. In some examples, aspects of the operations of 610 may be performed by a determination component as described with reference to FIG. 4.

At 615, the memory device may generate a descriptor for the portion of the memory array based on determining that the quantity of physical addresses of the portion of the memory array satisfies the second threshold. The operations of 615 may be performed according to the methods described herein. In some examples, aspects of the operations of 615 may be performed by a generation component as described with reference to FIG. 4.

At 620, the memory device may store the descriptor in a cache associated with the memory array. The operations of 620 may be performed according to the methods described herein. In some examples, aspects of the operations of 620 may be performed by a storing component as described with reference to FIG. 4.

In some examples, an apparatus as described herein may perform a method or methods, such as the method 600. The apparatus may include features, means, or instructions (e.g., a non-transitory computer-readable medium storing instructions executable by a processor) for determining whether a quantity of read operations performed on a portion of a memory array satisfies a first threshold, determining whether a quantity of physical addresses of the portion of the memory array satisfies a second threshold based on determining that the quantity of read operations satisfies the first threshold, generating a descriptor for the portion of the memory array based on determining that the quantity of physical addresses of the portion of the memory array satisfies the second threshold, and storing the descriptor in a cache associated with the memory array.

Some examples of the method 600 and the apparatus described herein may further include operations, features, means, or instructions for generating a second descriptor for a second portion of the memory array based on the quantity of physical addresses of the second portion of the memory array satisfying the second threshold, attempting to store the second descriptor in the cache associated with the memory array based on generating the second descriptor, and determining whether the cache may be full based on attempting to store the second descriptor.

Some examples of the method 600 and the apparatus described herein may further include operations, features, means, or instructions for determining whether the quantity of physical addresses of the second portion of the memory array satisfies the quantity of physical addresses of the portion of the memory array, removing the descriptor from the cache based on determining that the quantity of physical addresses of the second portion of the memory array satisfies the quantity of physical addresses of the portion of the memory array, and storing the second descriptor in the cache based on removing the descriptor.

Some examples of the method 600 and the apparatus described herein may further include operations, features, means, or instructions for determining whether the quantity of physical addresses of the second portion of the memory array does not satisfy the quantity of physical addresses of the portion of the memory array, and refraining from storing the second descriptor in the cache based on determining that the quantity of physical addresses of the second portion of the memory array does not satisfy the quantity of physical addresses of the portion of the memory array.

Some examples of the method 600 and the apparatus described herein may further include operations, features, means, or instructions for identifying a portion of data having undergone the quantity of read operations that satisfies the first threshold, identifying physical addresses of the portion of data that satisfies the first threshold, and identifying a portion of the physical addresses having continuous physical addresses based on identifying the physical addresses of the portion of data that satisfies the first threshold, where generating the descriptor may be based on identifying the portion of the physical addresses having the continuous physical addresses.

Some examples of the method 600 and the apparatus described herein may further include operations, features, means, or instructions for determining whether a quantity of the continuous physical addresses satisfies the second threshold, where generating the descriptor may be based on the quantity satisfying the second threshold.

In some examples of the method 600 and the apparatus described herein, generating the descriptor may include operations, features, means, or instructions for determining continuous physical addresses of the portion of the memory array that satisfies the first threshold and the second threshold.

Some examples of the method 600 and the apparatus described herein may further include operations, features, means, or instructions for data associated with the quantity of read operations that satisfies the first threshold may be accessed more frequently within a duration than data associated with a quantity of read operations that does not satisfy the first threshold.

In some examples of the method 600 and the apparatus described herein, the descriptor includes a starting physical address of the portion of the memory array and the quantity of physical addresses of the portion of the memory array.

It should be noted that the methods described above describe possible implementations, and that the operations and the steps may be rearranged or otherwise modified and that other implementations are possible. Furthermore, portions from two or more of the methods may be combined.

An apparatus is described. The apparatus may include a memory device including a memory array having a set of memory cells, a first cache configured for storing mappings between a first set of logical addresses and a first set of physical addresses of the memory array, and a second cache configured for storing descriptors between a second set of logical addresses and a second set of physical addresses of the memory array, where a descriptor identifies a starting physical address of the memory array and a length of data to read for a read operation of an associated logical address.

In some examples, the second cache may be configured to store the descriptors between the second set of logical addresses and the second set of physical addresses based on a quantity of read operations performed on a portion of the memory array associated with the second set of physical addresses. In some examples, the memory device may be configured to update the descriptors stored at the second cache based on the quantity of read operations performed on a portion of the memory array associated with the second set of physical addresses.

In some examples, the memory device may be configured to receive a read command including a logical address of data of the memory array and read the associated data based on the descriptors stored at the second cache.

In some examples, the memory device may be configured to determine a physical address of the second set of physical addresses that may be associated with the logical address of the read command, where the memory device may be configured to read the associated data based on determining the physical address of the data.

In some examples, the second set of logical addresses include a set of sequential logical addresses, and where the second set of physical addresses include a set of sequential physical addresses. In some examples, the first cache may be coupled with the memory array and the second cache may be coupled with the first cache. In some examples, the first cache and the second cache may be located in a volatile memory coupled with the memory array.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A memory system, comprising:
one or more memory arrays; and
one or more controllers coupled with the one or more memory arrays and configured to cause the memory system to:
receive a read command comprising a logical address of a memory array of the one or more memory arrays of data requested by the read command;
determine whether the logical address is absent from a first cache, the first cache comprising mappings between a first set of logical addresses and of a first set of physical addresses of the memory array;
identify a descriptor associated with the logical address and that is stored in a second cache based at least in part on determining that the logical address is absent from the first cache, the second cache comprising one or more descriptors between a second set of logical addresses and a second set of physical addresses of the memory array, wherein the descriptor identifies a starting physical address of the second set of physical addresses, a starting logical address of the second set of logical addresses, and a length indicating a quantity of logical addresses associated with the descriptor; and
retrieve the data from the memory array based at least in part on the descriptor stored in the second cache.

2. The memory system of claim 1, wherein, to identify the descriptor, the one or more controllers are configured to cause the memory system to:
identify a subset of the second set of logical addresses based at least in part on the starting logical address, wherein
the second set of logical addresses comprises the quantity of logical addresses.

3. The memory system of claim 2, wherein the one or more controller are configured to cause the apparatus to:
determine that the logical address is included in the subset of the second set of logical addresses based at least in part on identifying the starting logical address of the subset of the second set of logical addresses and the quantity of logical addresses in the subset of the second set of logical addresses.

4. The memory system of claim 1, wherein the one or more controllers are configured to cause the memory system to:
identify a physical address associated with the logical address based at least in part on the descriptor stored in the second cache, wherein retrieving the data is based at least in part on identifying the physical address.

5. The memory system of claim 4, wherein, to identify the physical address, the one or more controllers are configured to cause the memory system to:
identify a subset of the second set of logical addresses based at least in part on the starting logical address; and
determining a second quantity of addresses in the subset of the second set of logical addresses that are between the starting logical address and the logical address requested by the read command.

6. The memory system of claim 5, wherein the one or more controllers are configured to cause the memory system to:
identify a subset of the second set of physical addresses that are associated with the subset of the second set of logical addresses based at least in part on the starting physical address, wherein a physical address associated with the logical address requested by the read command is based at least in part on the starting physical address of the subset of the second set of physical addresses and the second quantity of addresses between the starting logical address and the logical address requested by the read command.

7. The memory system of claim 1, wherein the one or more controllers are configured to cause the memory system to:
determine that the descriptor associated with the logical address of the read command is not stored in the second cache;
generate the descriptor associated with the logical address and a corresponding physical address of the memory array based at least in part on determining that the descriptor associated with the logical address of the read command is not stored in the second cache; and
store the descriptor to the second cache.

8. The memory system of claim 1, wherein, to retrieve the data from the memory array, the one or more controllers are configured to cause the memory system to:
read a memory cell of the memory array that is associated with a physical address corresponding to the logical address.

9. A memory system, comprising:
one or more memory arrays having a plurality of memory cells;
a first cache configured for storing mappings between a first set of logical addresses and a first set of physical addresses a memory array of of the oen or more memory array; and
a second cache configured for storing descriptors between a second set of logical addresses and a second set of physical addresses of the memory array, wherein a descriptor identifies a starting physical address of the second set of physical addresses, a starting logical address of the second set of logical addresses, and a length indicating a quantity of logical addresses associated with the descriptor.

10. The memory system of claim 9, wherein the second cache is configured to store the descriptors between the second set of logical addresses and the second set of physical addresses based at least in part on a quantity of read operations performed on a portion of the memory array associated with the second set of physical addresses.

11. The memory system of claim 10, wherein the memory system is configured to update the descriptors stored at the second cache based at least in part on the quantity of read operations performed on a portion of the memory array associated with the second set of physical addresses.

12. The memory system of claim 9, wherein the memory system is configured to receive a read command comprising a logical address of data of the memory array and read the associated data based at least in part on the descriptors stored at the second cache.

13. The memory system of claim 12, wherein the memory system is configured to determine a physical address of the second set of physical addresses that is associated with a logical address of the read command, wherein the memory system is configured to read the associated data based at least in part on determining the physical address of the data.

14. The memory system of claim 9, wherein the second set of logical addresses comprise a plurality of sequential logical addresses, and wherein the second set of physical addresses comprise a plurality of sequential physical addresses.

15. The memory system of claim 9, wherein the first cache is coupled with the memory array and the second cache is coupled with the first cache.

16. The memory system of claim 9, wherein the first cache and the second cache are located in a volatile memory coupled with the memory array.

17. A memory system, comprising:
one or more memory arrays; and
one or more controllers coupled with the one or more memory arrays and configured to cause the memory system to:
determine whether a quantity of read operations performed on a portion of a memory array of the one or more memory arrays satisfies a first threshold;
determine whether a quantity of physical addresses of the portion of the memory array satisfies a second threshold based at least in part on determining that the quantity of read operations satisfies the first threshold;
generate a descriptor for the portion of the memory array based at least in part on determining that the quantity of physical addresses of the portion of the memory array satisfies the second threshold; and
store the descriptor in a cache associated with the memory array.

18. The memory system of claim 17, wherein the one or more controllers are configured to cause the memory system to:
generate a second descriptor for a second portion of the memory array based at least in part on the quantity of physical addresses of the second portion of the memory array satisfying the second threshold;
attempt to store the second descriptor in the cache associated with the memory array based at least in part on generating the second descriptor; and
determine whether the cache is full based at least in part on attempting to store the second descriptor.

19. The memory system of claim 18, wherein the one or more controllers are configured to cause the memory system to:
determine whether the quantity of physical addresses of the second portion of the memory array satisfies the quantity of physical addresses of the portion of the memory array;
remove the descriptor from the cache based at least in part on determining that the quantity of physical addresses of the second portion of the memory array satisfies the quantity of physical addresses of the portion of the memory array; and
store the second descriptor in the cache based at least in part on removing the descriptor.

20. The memory system of claim 18, wherein the one or more controllers are configured to cause the memory system to:
determine whether the quantity of physical addresses of the second portion of the memory array does not satisfy the quantity of physical addresses of the portion of the memory array; and
refrain from storing the second descriptor in the cache based at least in part on determining that the quantity of physical addresses of the second portion of the memory array does not satisfy the quantity of physical addresses of the portion of the memory array.

21. The memory system of claim 18, wherein the one or more controllers are configured to cause the memory system to:
identify a portion of data having undergone the quantity of read operations that satisfies the first threshold;

identify physical addresses of the portion of data that satisfies the first threshold; and identify a portion of the physical addresses having continuous physical addresses based at least in part on identifying the physical addresses of the portion of data that satisfies the first threshold, wherein generating the descriptor is based at least in part on identifying the portion of the physical addresses having the continuous physical addresses.

22. The memory system of claim 21, wherein the one or more controllers are configured to cause the memory system to:

determine whether a quantity of the continuous physical addresses satisfies the second threshold, wherein generating the descriptor is based at least in part on the quantity satisfying the second threshold.

23. The memory system of claim 18, wherein, to generate the descriptor, the one or more controllers are configured to cause the memory system to:

determine continuous physical addresses of the portion of the memory array that satisfies the first threshold and the second threshold.

24. The memory system of claim 18, wherein data associated with the quantity of read operations that satisfies the first threshold is accessed more frequently within a duration than data associated with a quantity of read operations that does not satisfy the first threshold.

25. The memory system of claim 18, wherein the descriptor comprises a starting physical address of the portion of the memory array and the quantity of physical addresses of the portion of the memory array.

\* \* \* \* \*